United States Patent [19]
Shibata

[11] Patent Number: 5,925,953
[45] Date of Patent: Jul. 20, 1999

[54] ABSOLUTE ENCODER AVOIDING MAGNETIC INTERFERENCE

[75] Inventor: Shinji Shibata, Niwa-gun, Japan

[73] Assignee: Okuma Corporation, Nagoya, Japan

[21] Appl. No.: 08/813,291

[22] Filed: Mar. 10, 1997

[30] Foreign Application Priority Data

Mar. 25, 1996 [JP] Japan .................................. 8-068038

[51] Int. Cl.$^6$ ................................................ H02K 7/06
[52] U.S. Cl. ...................... 310/83; 310/68 E; 310/67 R; 310/68 R
[58] Field of Search ................ 310/67 R, 68 R, 310/83; 318/661, 602, 567; 364/565; 324/163, 160, 165; 417/16, 17, 42

[56] References Cited

U.S. PATENT DOCUMENTS

| | | | |
|---|---|---|---|
| 4,572,951 | 2/1986 | Toda et al. | 250/231 |
| 4,575,666 | 3/1986 | Nakashima et al. | 318/661 |
| 5,032,750 | 7/1991 | Hayashi | 310/83 |
| 5,260,650 | 11/1993 | Schwesig et al. | 324/163 |
| 5,393,201 | 2/1995 | Okutani et al. | 417/16 |
| 5,710,509 | 1/1998 | Goto et al. | 324/207 |
| 5,739,775 | 4/1998 | Brandestini | 341/10 |

FOREIGN PATENT DOCUMENTS

| | | | |
|---|---|---|---|
| A-2-12014 | 1/1990 | Japan | 310/83 |
| A-3-28715 | 2/1991 | Japan | 310/83 |
| A-9-28069 | 1/1997 | Japan | 310/83 |

*Primary Examiner*—Nestor Ramirez
*Assistant Examiner*—Elvin G. Enad
*Attorney, Agent, or Firm*—Oliff & Berridge, PLC

[57] ABSTRACT

A correcting signal generator 42 stores the quantitative relation of the magnetic interference between the rotation angle θ3 of a resolver 23 and the detected values A3, B3 of a resolver 22, and outputs the correcting values A8, B8 for the magnetic interference according to the rotation angle θ3. An adder 41 calculates and outputs the corrected detection values A4, B4 by adding the correcting values A8, B8 to the detected values A3, B3 of the resolver 22 output from a latch circuit 14. A resolver rotation angle calculation circuit 47 calculates and outputs an angle θ2 by taking an arc tangent of the quotient A4/B4 of the corrected detection values A4, B4. In the same way, a correcting signal generator 44 calculates and outputs the angle θ3.

4 Claims, 4 Drawing Sheets

ABSOLUTE ENCODER AVOIDING MAGNETIC INTERFERENCE

BACKGROUND OF THE INVENTION

1. Field of the Invention

The present invention relates to an absolute encoder for detecting a rotation angle of a rotary shaft over a plurality of rotations, more particularly to an absolute encoder utilizing reluctance.

2. Description of the Prior Art

It is known that an absolute encoder can detect a rotation angle of a rotary shaft over a plurality of, for example, several hundred rotations. The principle of this detection is to detect the rotation angle of the rotary shaft on the basis of the angles detected by the resolvers attached to the rotary shaft and the other slowed-down rotary shafts for detecting rotation angles during one rotation of the respective rotary shafts.

In conventional absolute encoders, a plurality of resolvers are used and magnetic interference among these resolvers is a problem. That is to say, because a magnetic field generated by a detecting resolver reaches adjacent resolvers, inductance change depending on the rotation angles of other resolvers is added to the inductance change in the detecting resolver itself. Consequently, the detected inductance change actually corresponds to the resultant inductance change. Therefore, satisfactory detecting accuracy can not be obtained. In order to avoid the magnetic interference, it is necessary to arrange the respective resolvers apart at such a distance that the magnetic interference does not occur which results in the problem that the equipment becomes very large.

SUMMARY OF THE INVENTION

The present invention solves this problem. An object of the present invention is to provide a small size absolute encoder by reducing the distance between the respective resolvers through elimination of the effect of the inductance change due to other resolvers.

In order to solve the problem, an absolute encoder according to the present invention detects the long-range rotation angles over a plurality of rotations of at least one rotary shaft among a plurality of rotary shafts on the basis of the angles detected by a plurality of the resolvers which are respectively attached to the respective rotary shafts having predetermined speed ratios. This encoder comprises a correcting signal generator for generating a correcting signal eliminating the signal components depending on other resolvers with respect to at least one resolver, an adder for obtaining a corrected detection signal by adding the correcting signal concerning this resolver to the signal detected by this resolver, a resolver rotation angle calculation circuit for calculating the rotation angle of this resolver on the basis of the corrected detection signal, and a long-range rotation angle calculating circuit for calculating the absolute rotation angles covering a plurality of rotations of the rotary shafts on the basis of the output from a plurality of the resolver rotation angle calculation circuits.

According to this configuration, it is possible to eliminate the effects of the inductance change generated by a resolver other than those to be used for detecting the rotation angle of the rotary shaft, to reduce the distances among a plurality of the resolvers, and to miniaturize the outer shape of the equipment.

Further, it is also possible to concentrically arrange a plurality of the resolvers concerning the calculation of the corrected detection signals. With such an arrangement, it is possible to simplify the effects of one resolver on other resolvers and thereby simplify the generation of the correcting signals.

Further, it is also possible to generate correcting signals on the basis of the signals detected by at least one adjacent resolver. Because only the magnetic interference between adjacent resolvers is taken into consideration, the generation of the correcting signals can be simplified.

Further, it is also possible to generate the correcting signals by reading out according to the rotation angle correcting signals stored beforehand according to the rotation angles of the adjacent resolvers. In this method, it is not necessary to calculate the correcting signals each time the rotation angles are detected, and circuit load for calculating correcting signals can be reduced.

DESCRIPTION OF THE PREFERRED EMBODIMENT

A preferred embodiment of the absolute encoder according to the present invention will now be described with reference to the accompanying drawings.

Figure 1:
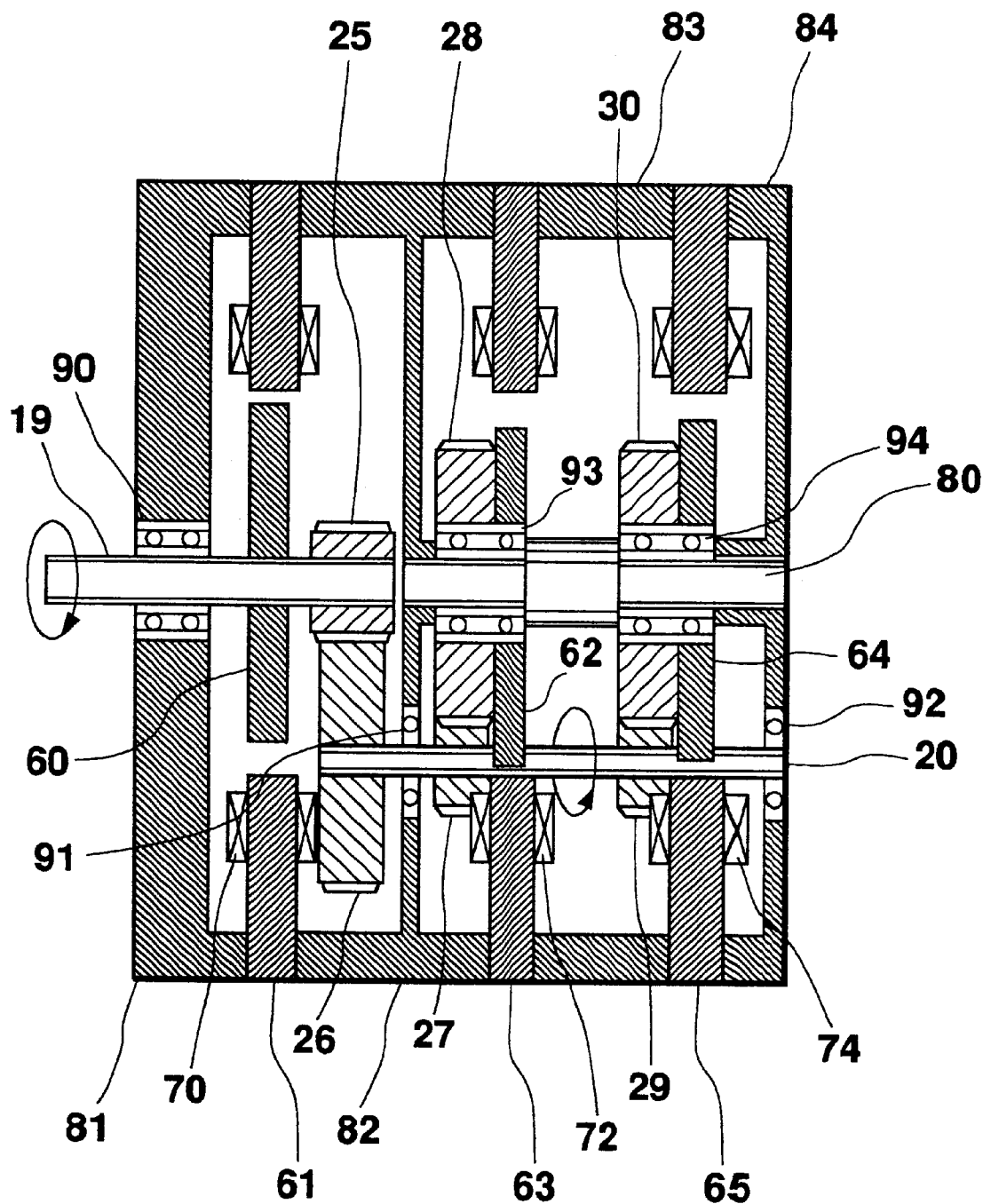
FIG. 1 is a drawing showing the structure of an absolute encoder according to the present invention.
Figure 2:
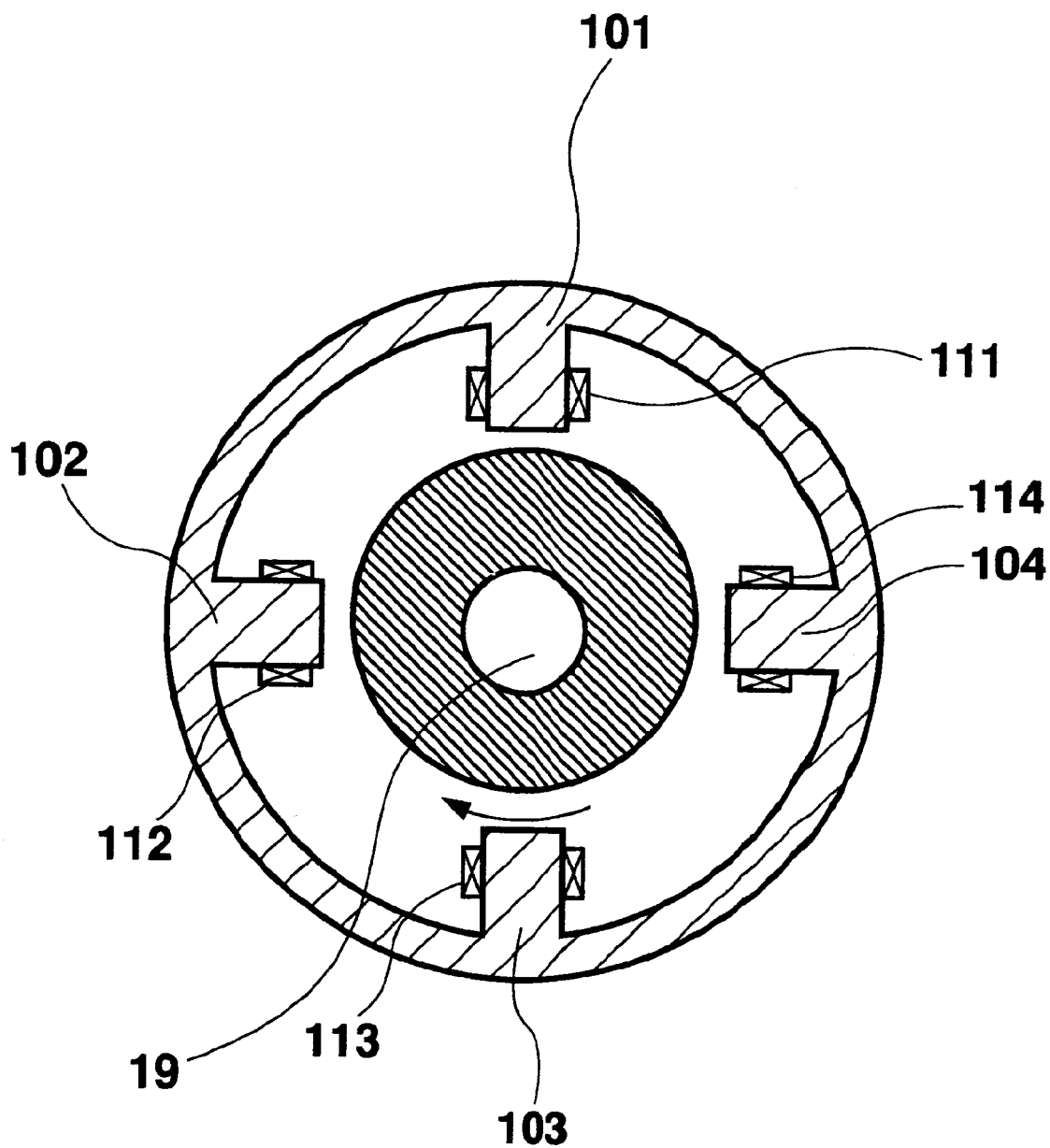
FIG. 2 is a cross sectional view of one resolver in the encoder shown in FIG. 1.

FIG. 1 shows the structure of the absolute encoder using three resolvers having different rotational speeds. FIG. 2 shows a cross section of one resolver.

An input shaft 19 of the absolute encoder is mounted in a casing 81 via a bearing 90. A non-magnetic substance gear 25 and a rotor 60 are fitted on the input shaft 19. A shaft 20 is mounted in casings 82 and 84 via bearings 91 and 92. Non-magnetic substance gears 26, 27, 29 are fitted on the shaft 20. An axle 80 is supported by the casings 82 and 84. A non-magnetic substance gear 28 and a rotor 62 are mounted on the axle 80 via a bearing 93. A non-magnetic substance gear 30 and a rotor 64 are mounted on the axle 80 via a bearing 94.

A reduction gear mechanism is formed by engaging the gear 25 with the gear 26, the gear 27 with the gear 28, and the gear 29 with the gear 30. The gear 28 is fixed to the rotor 62, and the gear 30 to the rotor 64. According to this reduction gear mechanism, the rotor 62 rotates by one revolution during 24 revolutions of the input shaft 19, and the rotor 64 rotates by one revolution during 25 revolutions of the input shaft 19.

Stators 61, 63, 65 are fixed to the casings 81, 82, 83, 84. The stators 61, 63, 65 and the rotors 60, 62, 64 are all made of magnetic substance. The rotors 60, 62, 64 have cylindrical shapes, and eccentrically rotate about their rotational axes. As shown in FIG. 2, each resolver has four tooth poles 101, 102, 103, 104 on each stator. Windings 111, 112, 113, 114 are wound around these tooth poles. The rotational position of the rotor can be detected by sensing the change of inductance of each winding caused by the change of the air gap between the rotor and the tooth pole of the stator caused by the rotation of the rotor.

Figure 3:
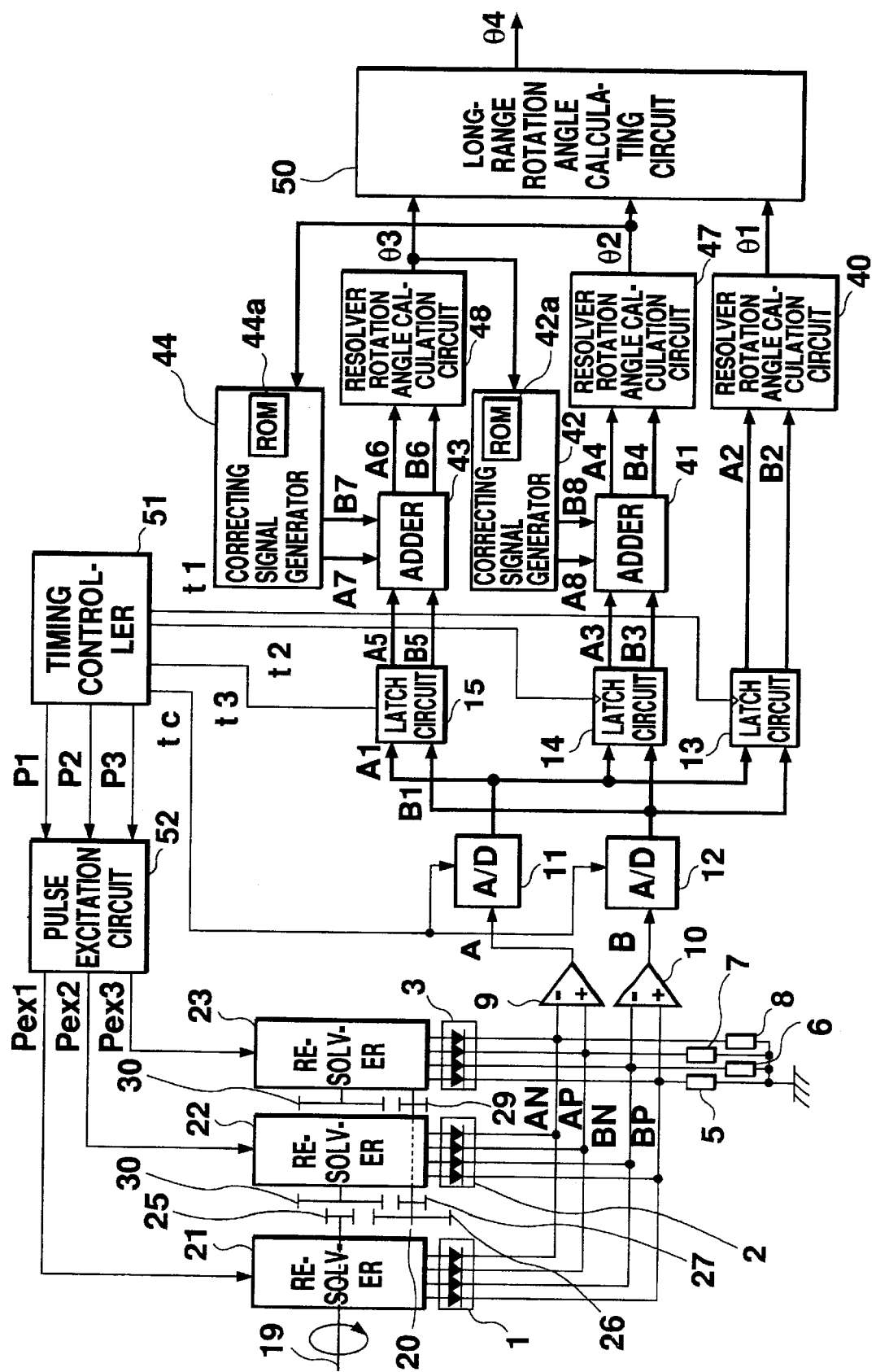
FIG. 3 is a block diagram showing a circuit configuration of an absolute encoder according to the present invention.

FIG. 3 shows the circuit configuration of the absolute encoder of this embodiment. The same elements as those shown in FIGS. 1 and 2 have the same numerals as those in FIGS. 1 and 2, and explanation for them are omitted here. The resolvers 21, 22, and 23 shown in FIG. 3 correspond to the resolvers composed of the pairs of the stator 61 and the rotor 60, the stator 63 and the rotor 62, and the stator 65 and the rotor 64 respectively.

One ends of the four windings of each winding part are all connected to a pulse excitation circuit 52, and the other ends of each of the four windings are all connected to each of the four anodes of diode arrays 1, 2, 3. Each cathode of the diode arrays 1, 2, 3 is connected to each of current detecting resistors 5, 6, 7, 8. The pulse excitation circuit 52 performs the pulse excitation for the winding parts 70, 72, 74 of the respective resolvers 21, 22, 23 by pulse excitation signals Pex 1, Pex 2, Pex 3. Timing of these pulse excitation signals is controlled by the timing signals P1, P2, P3 output from a timing controller 51. Change of the inductance of the respective windings of the excited winding parts is detected by measuring the current of the windings by means of detecting resistors 5~8 at a certain time later from the excitation. In addition, differential current between two windings are detected by differential amplifiers 9 and 10. Signals A and B having the amplitude proportional to a sine and a cosine of the rotational angle of the rotor are detected. The signals A and B are digitized by A/D converters 11 and 12 on the basis of a conversion start signal to output from the timing controller 51, and converted into a sine wave signal A1 and a cosine wave signal B1.

The sine wave signal A1 and the cosine wave signal B1 are stored into a latch circuit 13 by a timing signal t1 synchronized to the excitation signal Pex 1, as a detected value of the resolver 21. Similarly, the sine wave signal A1 and the cosine wave signal B1 are stored into a latch circuit 14 by a timing signal t2 synchronized to the excitation signal Pex 2, as a detected value of the resolver 22, and the sine wave signal A1 and the cosine wave signal B1 are stored into a latch circuit 15 by a timing signal t3 synchronized to the excitation signal Pex 3, as a detected value of the resolver 23. Thus, the resolver which sent the sine wave signal A1 and the cosine wave signal B1 can be identified by the timing signal t1, t2, t3 output from the timing controller 51. The resolver rotation angle calculation circuit 40 calculates and outputs the rotation angle θ1 of the resolver 21 by taking an arc tangent of the quotient A2/B2 of the detected values A2 and B2 of the resolver 21 output from the latch circuit 13.

In this embodiment, the distance between the rotor 62 and the rotor 64 shown in FIG. 1 is taken as short as possible. For this reason, the resolver 22 composed of the rotor 62, the stator 64, and the winding 72 interferes magnetically with the resolver 23 composed of the rotor 64, the stator 65, and the winding 74.

Figure 4:
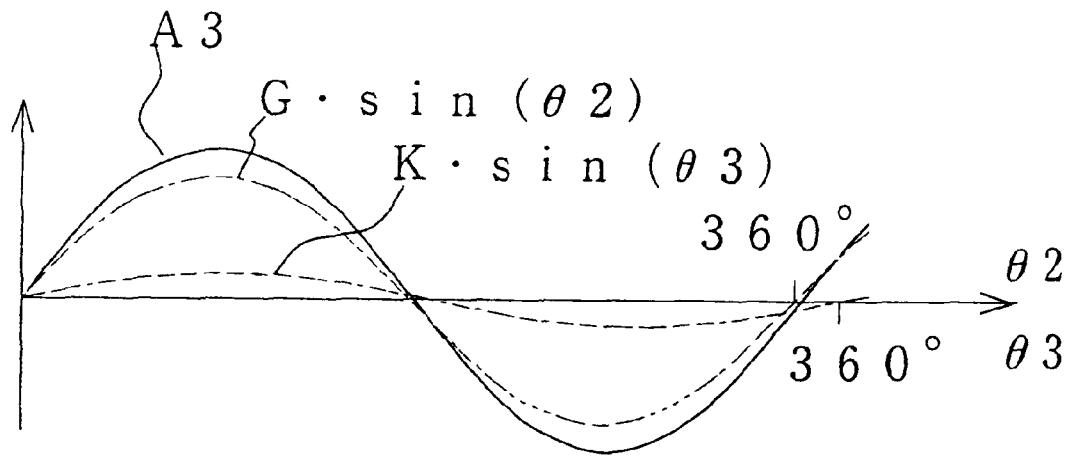
FIG. 4 is a figure showing the relation between the rotation angle of a rotor of a resolver and the detected signal.
Figure 5:
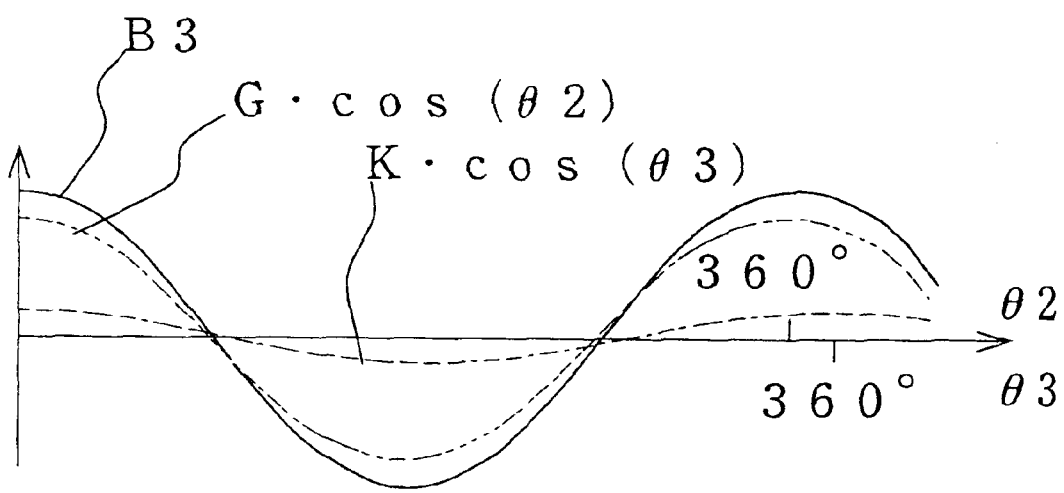
FIG. 5 is a figure showing the relation between the rotation angle of a rotor of a resolver and the detected signal.

The relations between the rotation angle θ2 of the detecting resolver 22 and the detected values A3, and B3 are shown in FIGS. 4 and 5. The relations are given by the following Eqs. (1) and (2), $$A3 = G \cdot \sin(\theta 2) + K \cdot \sin(\theta 3), \quad (1)$$

$$B3 = G \cdot \cos(\theta 2) + K \cdot \cos(\theta 3), \quad (2)$$

where G is a coefficient showing the rate of inductance change, and K is a coefficient showing the rate of magnetic interference. A3 and B3 are the sum of the signal of the detecting resolver alone and the signal component depending on the rotation angle θ3 of the adjacent resolver 23. The coefficients G and K depend on specifications of the encoder such as the arrangement of each resolver, and have values peculiar to each encoder. The coefficient K is stored in a ROM 42a in a correcting signal generator 42.

Accordingly, the correcting signal generator 42 executes the calculation of Eqs. (3) and (4) on the basis of the angle θ3 of the resolver 22, and outputs the following correcting values A8 and B8 which show the amounts of the magnetic interference contained in the detected values A3 and B3 of the resolver 22, $$A8 = -K \cdot \sin(\theta 3), \quad (3)$$

$$B8 = -K \cdot \cos(\theta 3). \quad (4)$$

An adder 41 calculates and outputs the detected values A4 and B4 corrected by adding the correcting values A8 and B8 to the detected values A3 and B3 of the resolver 22 output from a latch circuit 14. A resolver rotation angle calculation circuit 47 calculates and outputs the angle θ2 by taking an arc tangent of the quotient A4/B4 of the corrected detection values A4 and B4.

In the same way, a correcting signal generator 44 executes the calculation of the following Eqs. (5) and (6) on the basis of the angle θ2 of the resolver 22, and outputs the following correcting values A7 and B7 which show the amounts of the magnetic interference contained in the detected values A5 and B5 of the resolver 23, $$A7 = -K \cdot \sin(\theta 2), \quad (5)$$

$$B7 = -K \cdot \cos(\theta 2). \quad (6)$$

The coefficient K is stored in a ROM 44a in a correcting signal generator 44. An adder 43 calculates and outputs the detected values A6 and B6 corrected by adding the correcting values A7 and B7 to the detected values A5 and B5 of the resolver 23 output from a latch circuit 15. A resolver rotation angle calculation circuit 48 calculates and outputs the angle θ3 by taking an arc tangent of the quotient A6/B6 of the corrected detection values A6 and B6. The angles θ1, θ2, θ3 are represented by integers within 0 to 255. An angle θ4 is calculated by the following Eqs. (7), (8), (9) using a long-range rotation angle calculating circuit 50 for the given values of the rotation angles θ1, θ2, θ3, $$\theta 2' = \theta 1 + 256 \cdot \{(24 \cdot \theta 2 - \theta 1 + 128)/256\}, \quad (7)$$

when $$\theta 2' - 25 \cdot \theta 3 \leq 0, \quad \theta 4 = \theta 2' + 6 \; 144 \cdot \{(\theta 2' - 25 \cdot \theta 3 + 128)/256\}, \quad (8)$$

and when $$\theta 2' - 25 \cdot \theta 3 < 0, \quad \theta 4 = \theta 2' + 6 \; 144 \cdot \{(\theta 2' - 25 \cdot \theta 3 + 6 \; 528)/256\}. \quad (9)$$

Numerical calculation in Eqs. (7), (8), and (9) should be executed with integer values. Thus, the rotation angle θ4 can be represented by integers within 0 to 153599 in the range of up to 600 revolutions of the input shaft 19.

The magnetic interference depends on the relative position between adjacent resolvers. Accordingly, it may also be satisfactory to measure the amount of the magnetic interference between the angle θ3 of the resolver 23 and the detected values A3, B3 of the resolver 22 in a manufacturing stage of this absolute encoder, and store the measured amount into the ROM 42a. For the correcting signal generator 44, the situation is the same as that in the correcting signal generator 42. Numerical values of a sine wave table having an amplitude corresponding to the level of the magnetic interference may be used as numerals to be stored into the ROMs 42a and 44a. In this case, the correcting values A8 and B8 should be output so as to be 90° out of phase with each other.

In the above embodiment, correction between the detected signals of the resolvers 22 and 23 arranged in close proximity is conducted. It is also possible to take into consideration the interference between other resolvers according to desired accuracy.

What is claimed is:

1. An absolute encoder for detecting an absolute rotation angle of a rotary shaft over a plurality of rotations comprising:

a plurality of resolvers, each resolver being provided with a rotor having a predetermined speed ratio for the rotary shaft respectively and outputting rotation angles of the rotor as detected signals;

a correcting signal generator which outputs a correcting signal for at least one resolver for eliminating signal components generated by at least one other resolver among the plurality of resolvers;

one or more adders which output corrected detection signals by adding the correcting signal for the at least one resolver to the detected signals of the at least one resolver;

a plurality of resolver rotation angle calculation circuits which calculate the rotation angles of each resolver for which the correcting signal is generated based on the corrected detection signals, and the rotation angles of each resolver for which the correcting signal is not generated based on the detected signals; and a long-range rotation angle calculating circuit which calculates the absolute rotational angles concerning a plurality of rotations of the rotary shaft based on calculated results of the plurality of the resolver rotation angle calculation circuits.

2. An absolute encoder according to claim (1), wherein the resolvers, for which the correcting signals 15 generated, are concentrically arranged.

3. An absolute encoder according to claim (1), wherein correcting signals are generated based on the detected signals of at least one adjacent resolver.

4. An absolute encoder according to claim (1), wherein correcting signals stored in the correcting signal generator beforehand are read, out from the correcting signal generator according to the rotation angles of adjacent resolvers.

* * * * *